Patented Nov. 2, 1948

2,453,057

UNITED STATES PATENT OFFICE 2,453,057

N-MONOFORMYL-N,N'-DISUBSTITUTED ETHYLENEDIAMINES

Ferdinand B. Zienty, St. Louis, Mo., assignor to Monsanto Chemical Company, St. Louis, Mo., a corporation of Delaware No Drawing. Application June 11, 1945, Serial No. 598,923

12 Claims. (Cl. 260—561)

This invention relates to N,N'-dialkyl, N,N'-diaralkyl, N,N'-diaryl and N,N'-dicycloalkyl ethylenediamines and more particularly to N-formyl derivatives thereof and to a novel process for preparing them.

I have found that N-monoformyl derivatives of N,N'-dialkyl, N,N'-diaralkyl, N,N'-diaryl and N,N'-dicycloalkyl ethylenediamines may be prepared in good yield under certain circumstances. Acylated derivatives of ethylenediamines have been prepared by reacting certain acyl chlorides such as acetyl chloride or benzoyl chloride with ethylenediamine. However, the yields of the N-monoacyl derivative are very poor. Attempts to react formic acid with ethylenediamine have failed to yield any appreciable amount of an N-formyl ethylenediamine. I have found it necessary to react ethylenediamine with an alkyl formate such as ethyl formate, for example, by cautiously mixing 0.3 mole of ethyl formate with 1.2 moles of ethylenediamine and subsequently fractionally distilling the reaction mixture under reduced pressure and recovering the fraction boiling at approximately 90–110°/14 mm. The yield of N-formyl ethylenediamine by this process was relatively low.

According to the present invention, generally stated, N-monoformyl derivatives of N,N'-dialkyl, N,N'-diaralkyl, N,N'-diaryl and N,N'-dicycloalkyl ethylenediamines may be prepared in good yields by heating formic acid and an N,N'-di-substituted ethylenediamine of the type described under conditions such that the reactants are dehydrated to the extent that substantially only one mole of water is split off from the reactants for each mole of the N,N'-di-substituted ethylenediamine starting material. To accomplish this, the reaction is conducted in the presence of the water of dehydration thus evolved. This in turn is accomplished most readily by heating the reaction mixture to the appropriate dehydration temperature under a reflux condenser, whereby the water of dehydration which tends to vaporize at the reaction temperature is returned to the reaction mixture. It is to be understood that the appropriate temperature of dehydration will vary with the specific properties of the N,N'-di-substituted ethylenediamine starting material. In some instances, the reaction mixture may actually reflux at the temperature of dehydration whereas in other instances the presence of the reflux condenser in the system merely insures that the water of dehydration will be retained in the reaction mixture.

In a preferred embodiment of my invention the formic acid may be heated substantially to the reaction temperature and the N,N'-di-substituted ethylenediamine may be added gradually to the formic acid, the reaction held at the temperature of the desired monodehydration of the reactants and the system being enclosed and equipped with a reflux condenser.

In a further embodiment of my invention, the formic acid and the N,N'-di-substituted ethylenediamine may be mixed at a temperature below the dehydration point and subsequently heated under a reflux condenser to split off substantially one mole of water for the formation of the corresponding N - monoformyl-N,N'-di - substituted ethylenediamine. The reaction temperature may vary with the particular respective reactants employed. For example, in the preparation of N-monoformyl-N,N'-dibutyl ethylenediamine, the reaction temperature is desirably in the range of 102–113° C. In the preparation of N-monoformyl-N,N'-dicyclohexyl ethylenediamine, the reaction temperature is desirably in the range of 100–130° C. or even higher. It is to be understood that the reaction temperature may be elevated above the temperature for monodehydration of the product. However, an extensive elevation of the temperature of the reaction mixture tends to give rise to the formation of diformyl derivatives which in this instance are undesired products. The ratio of formic acid to N,N'-di-substituted ethylenediamine may be varied over a wide range, for example, from 3:1 to 10:1 or even higher depending upon the particular reactants selected. For example, in the preparation of N-monoformyl-N,N'-dibutyl ethylenediamine, the ratio is desirably 3:1. In the preparation of N-monoformyl-N,N'-dicyclohexyl ethylenediamine, the ratio is desirably 6:1 and may be as high as 10:1. In general, the yield of the desired product tends to be better at the lower ratio.

The process of the present invention may be applied to the preparation of N-monoformyl derivatives of N,N'-dialkyl, N,N'-diaralkyl, N,N'-diaryl and N,N'-dicycloalkyl ethylenediamines in which the alkyl radicals may have from 1 to 24 carbon atoms or more and may be branched or straight chain structures, the aryl radicals may be monocyclic or polycyclic and the cycloalkyl radicals may have from 3 to 6 carbon atoms. The hydrogen atoms of the ethylene residue of the N,N'-di-substituted ethylene-diamines may be substituted by any desired radicals, for example alkyl, cycloalkyl, arylalkoxy, aryloxy, alkoxyalkyl or aryloxyalkyl radicals. It is desirable to employ N,N'-di-substituted ethylenediamines which contain no acyl-reactive groups other than the hydrogen atoms of the two amino radicals of the ethylenediamine, since it is not always, though sometimes, possible to insure that the formyl radical will appear on one of the two amino radicals of the diamine. The following compounds are typical products of the process of the present invention:

N-formyl-N,N'-diethyl ethylenediamine
N-formyl-N,N'-diisopropyl ethylenediamine
N-formyl-N,N'-dipropyl ethylenediamine
N-formyl-N,N'-dibutyl ethylenediamine
N-formyl-N,N'-dioctyl ethylenediamine
N-formyl-N,N'-diethylhexyl ethylenediamine
N-formyl-N,N'-didodecyl-1-tridecyl ethylenediamine
N-formyl-N,N'-dicyclohexyl ethylenediamine
N-formyl-N,N'-dicyclohexyl-1-methyl-2-heptyl ethylenediamine
N-formyl-N,N'-diphenyl ethylenediamine
N-formyl-N,N'-dinaphthyl ethylenediamine The N-monoformyl derivatives of the ethylenediamines are useful as intermediates in the preparation of plasticizers for cellulose esters and synthetic resin plastics, in the preparation of insecticidal and fungicidal toxicants and in the preparation of decorative ingredients for plastic compositions. The N-monoformyl derivatives of the ethylenediamines range in form from liquids to waxy solids and are surprisingly stable, even at elevated temperatures, for example in the range of 200–230° C.

The following examples will serve to illustrate the novel process and products of the present invention. These examples are to be construed merely as illustrative and not as limiting the invention except as defined in the appended claims.

Example I

Technical formic acid (108 grams or 2 moles) was heated under a reflux condenser with stirring in an oil bath having a temperature of 130° C., and 112 grams (0.5 mole) of N,N'-dicyclohexyl ethylenediamine was added slowly during the course of three hours. At this point the reaction was substantially complete and the resulting mixture was then cooled to 30° C., poured into 500 cc. of water and the resulting mixture was filtered to remove solid material. The filtrate was rendered alkaline by the addition of excess 50% sodium hydroxide solution and the oily product was separated and distilled in vacuo. Yield, 85% of N-formyl-N,N'-dicyclohexyl-ethylenediamine; boiling point, 200–205° C./8 mm.

Example II

A mixture of 1 mole of N,N'-dibenzyl ethylenediamine and 5 moles of technical formic acid was prepared at a temperature of 75° C. The reaction mixture was heated under a reflux condenser with agitation in an oil bath, the temperature of which was slowly raised to a point within the range of 125–135° C. and maintained within that range for thirty minutes. The reaction mixture was thereafter cooled by addition of cold water and filtered to remove solids. The filtrate was rendered alkaline and N-formyl-N-N'-dibenzyl ethylenediamine was recovered from the resulting mixture.

Example III

A mixture of 108 grams (2 moles) of 85% formic acid and 106 grams (0.5 mole) of N,N'-diphenyl ethylenediamine was heated with stirring in a flask equipped with a reflux condenser and placed in a bath held at 130–135° C. The reaction temperature was 108° C. throughout the reaction period of 3.5 hours. The mixture was cooled to 90° C. and poured into 500 cc. of water. A red, viscous liquid formed a separate layer over the reaction mixture. This liquid was decanted, filtered and rendered alkaline with an excess of sodium hydroxide solution. The solid product which separated from the solution was N-formyl-N,N'-diphenyl ethylenediamine. This product was filtered off, washed with water and dried. Weight, 19 grams. The product was recrystallized from methanol. Melting point, 65–66° C.

Example IV

Two moles of technical formic acid and 0.5 mole of N,N'-dibutyl ethylenediamine were mixed at room temperature (25° C.) and the mixture was placed in a flask equipped with a thermometer, a stirrer and a reflux condenser and heated for 3 hours by means of an oil bath held at a temperature of 130° C. During this time the reaction temperature rose from 102° C. to 113° C. The mixture was heated for one hour longer and was then cooled to 50° C. and poured into water. An excess of 50% caustic soda solution was added. Benzene was added to dissolve the water-insoluble product and the benzene solution was separated from the water layer and distilled. The fraction boiling at 153–155° C./7 mm. was recovered. This fraction was N-formyl-N,N'-dibutyl ethylenediamine. Yield, 47 grams.

Example V

One mole of N,N'-diethyl ethylenediamine was slowly added over a period of three hours to 3 moles of technical formic acid heated under a reflux condenser with agitation in an oil bath maintained at a temperature of 115° C. The reaction mixture was thereafter cooled by the addition of cold water and the resulting solution was filtered. The filtrate was rendered alkaline and N-formyl-N,N'-diethyl ethylenediamine was recovered from the resulting mixture.

Example VI

One mole of N,N'-dipropyl ethylenediamine and 3 moles of technical formic acid were mixed at room temperature (25° C.) and heated under a reflux condenser with agitation by means of an oil bath maintained at a temperature of 120° C. After the reaction was complete, the reaction temperature was cooled by the addition of cold water and the resulting product was filtered. The filtrate was rendered alkaline and N-formyl-N,N'-dipropyl ethylenediamine was recovered from the resulting mixture.

Example VII

One mole of N,N'-didodecyl ethylenediamine was heated with agitation in an oil bath maintained at a temperature of 75° C. and 5 moles of technical formic acid were added thereto. The temperature of the oil bath was raised to 130° C. and maintained at that point until the reaction was complete. The reaction mixture was maintained under a reflux condenser during the heating period. The reaction mixture was thereafter cooled by pouring it into cold water. The mixture was rendered alkaline, and N-formyl-N,N'-didodecyl ethylenediamine was recovered from the resulting mixture.

Example VIII

Six moles of technical formic acid was heated under a reflux condenser with agitation by means of an oil bath maintained at a temperature of 135–145° C. and 1 mole of N,N'-didodecyl-1-tridecyl ethylenediamine was slowly added over a period of two hours. After the reaction was complete the reaction mixture was cooled by pouring it into cold water and the mixture was rendered alkaline. N-formyl - N,N' - didodecyl-1-tridecyl ethylene diamine was recovered from the mixture.

*Example IX*

One mole of N,N'-dicyclohexyl-1-methyl-2-heptyl ethylene diamine was mixed with 5 moles of technical formic acid at room temperature (25° C.) and the mixture was heated under a reflux condenser with agitation in an oil bath maintained at a temperature of 125–135° C. for two hours. The reaction mixture was poured into cold water, the resulting mixture was filtered and the filtrate was rendered alkaline. N-formyl - N,N'-dicyclohexyl-1-methyl-2-heptyl ethylenediamine was recovered from the mixture.

*Example X*

One mole of N,N'-dinaphthyl ethylenediamine was mixed with 5 moles of technical formic acid at room temperature (25° C.) and the mixture was heated under a reflux condenser with agitation in an oil bath maintained at a temperature of 125–135° C. for two hours. The reaction mixture was poured into cold water, the resulting mixture was filtered and the filtrate was rendered alkaline. N-formyl-N,N' - dinaphthyl ethylenediamine was recovered from the mixture.

*Example XI*

One mole of N,N'-dicyclopropyl ethylenediamine was mixed with 5 moles of technical formic acid at room temperature (25° C.) and the mixture was heated under a reflux condenser with agitation in an oil bath maintained at a temperature of 125–135° C. for two hours. The reaction mixture was poured into cold water, the resulting mixture was filtered and the filtrate was rendered alkaline. N-formyl - N,N' - dicyclopropyl ethylenediamine was recovered from the mixture.

*Example XII*

A 0.5 mole portion of a technical mixture of monohydric aliphatic alcohols containing from 8 to 18 carbon atoms and known to the trade as "Lorol" alcohols was converted to the corresponding alkyl chlorides. Of the quantity of mixed alkyl chlorides thus obtained, a 0.1 mole portion, calculated on the basis of the average chlorine content of the mixture, was heated at approximately 120° C. with 0.1 mole of ethylenediamine. The resulting mixture of N,N'-dialkyl ethylenediamines recovered from the reaction mixture contained alkyl radicals having from 8 to 18 carbon atoms. This material was then heated under a reflux condenser with 0.4 mole of 85% formic acid at a temperature of 100–130° C. until substantially one mole of water had split off for each mole of the N,N'-dialkyl ethylenediamine mixture, calculated on the average molecular weight of the mixture. The resulting N-formyl-N,N'-dialkyl ethylenediamine mixture contained alkyl radicals having from 8 to 18 carbon atoms. The N-formyl derivatives were recovered from the reaction mixture by quenching the reaction mixture with water, filtering, alkalizing the filtrate, extracting the filtrate with benzene and recovering the mixture of N-formyl-N,N'-dialkyl ethylenediamines from the benzene extract. This mixture was found to be particularly useful in the preparation of insecticidal, miticidal and fungicidal compositions.

I claim:

1. A method of preparing an N-monoformyl derivative of an N,N'-di-substituted ethylenediamine comprising heating in a reaction zone formic acid and an ethylenediamine selected from the group consisting of N,N'-dialkyl ethylenediamines, N,N' - diaralkyl ethylenediamines, N,N'-diaryl ethylenediamines and N,N'-dicycloalkyl ethylenediamines at a temperature at which substantially one mole of water splits off from the reactants for each mole of said ethylenediamine, retaining said water in said reaction zone during the course of the reaction and subsequently recovering said N-formyl derivative from the reaction mixture.

2. A method of preparing an N-monoformyl derivative of an N,N'-di-substituted ethylenediamine comprising heating in a reaction zone formic acid and an ethylenediamine selected from the group consisting of N,N'-dialkyl ethylenediamines, N,N'-diaralkyl ethylenediamines, N,N'-diaryl ethylenediamines and N,N'-dicycloalkyl ethylenediamines at a temperature in the range of 100–130° C. until substantially one mole of water is split off from the reactants for each mole of said ethylenediamine, retaining said water in said reaction zone during the course of the reaction and subsequently recovering said N-formyl derivative from the reaction mixture.

3. The process as defined in claim 1 in which the ratio of formic acid to N,N'-di-substituted ethylenediamine is in the range of 3:1 to 10:1.

4. A method of preparing an N-monoformyl derivative of an N,N'-di-substituted ethylenediamine comprising heating formic acid in a reaction zone under reflux conditions at a temperature in the range of 100–130° C., adding thereto an ethylenediamine selected from the group consisting of N,N'-dialkyl ethylenediamines, N,N'-diaralkyl ethylenediamines, N,N'-diaryl ethylenediamines and N,N'-dicycloalkyl ethylenediamines until the ratio of formic acid to said ethylenediamine is in the range of 3:1 to 10:1, maintaining the temperature until substantially one mole of water is split off from the reactants for each mole of said ethylenediamine, retaining said water in said reaction zone during the course of the reaction and subsequently recovering said N-formyl derivative from the reaction mixture.

5. A method of preparing N-monoformyl-N,N'-dibutyl ethylenediamine comprising heating in a reaction zone formic acid and N,N'-dibutyl ethylenediamine at a temperature in the range of 100–130° C. until substantially one mole of water splits off from the reactants for each mole of said N,N'-dibutyl ethylenediamine, retaining said water in said reaction zone during the course of the reaction and subsequently recovering N-monoformyl-N,N'-dibutyl ethylenediamine from the reaction mixture.

6. A method of preparing N-monoformyl-N,N'-dicyclohexyl ethylenediamine comprising heating in a reaction zone formic acid and N,N'-dicyclohexyl ethylenediamine at a temperature in the range of 100–130° C. until substantially one mole of water splits off from the reactants for each mole of said N,N'-dicyclohexyl ethylenediamine, retaining said water in said reaction zone during the course of the reaction and subsequently recovering N-monoformyl-N,N'-dicyclohexyl ethylenediamine from the reaction mixture.

7. As a new composition of matter an N-monoformyl derivative of an N,N'-di-substituted ethylenediamine selected from the group consisting of N,N'-dialkyl ethylenediamines, N,N'-diaralkyl ethylenediamines, N,N'-diaryl ethylenediamines and N,N'-dicycloalkyl ethylene diamines.

8. As a new composition of matter, N-monoformyl-N,N'-dibutyl ethylene diamine.

9. As a new composition of matter, N-monoformyl-N,N'-dicyclohexyl ethylenediamine.

10. As a new composition of matter, an N-monoformyl derivative of an N,N'-dialkyl ethylenediamine in which the N,N'-alkyl radicals have from 2 to 24 carbon atoms.

11. A method of preparing N-monoformyl-N,N'-dialkyl ethylenediamines comprising heating in a reaction zone formic acid and a mixture of N,N'-dialkyl ethylene diamines having an alkyl residue derived from a mixture of monohydric alcohols containing from 8 to 18 carbon atoms at a temperature in the range of 100–130° C. until substantially one mole of water splits off from the reactants for each mole of said mixture of N,N'-dialkyl ethylenediamines, retaining said water in said reaction zone during the course of the reaction and subsequently recovering a mixture of N-monoformyl-N,N'-dialkyl ethylenediamines having alkyl radicals in the range of 8 to 18 carbon atoms.

12. As a new composition of matter an N-monoformyl derivative of an N,N'-dialkyl ethylenediamine in which the N,N'-alkyl radicals have from 2 to 18 carbon atoms.

FERDINAND B. ZIENTY.

REFERENCES CITED

The following references are of record in the file of this patent:

UNITED STATES PATENTS

| Number | Name | Date |
|---|---|---|
| 1,926,015 | Rosenmund | Sept. 5, 1933 |
| 2,267,685 | Kyrides | Dec. 23, 1941 |

FOREIGN PATENTS

| Number | Country | Date |
|---|---|---|
| 561,156 | Germany | Oct. 12, 1932 |

OTHER REFERENCES

Hodgson et al.: Jour. Chem. Soc., London (1935), pages 671 to 674.